US007587482B2

(12) United States Patent
Henderson et al.

(10) Patent No.: US 7,587,482 B2
(45) Date of Patent: Sep. 8, 2009

(54) MULTIMODAL INTERFACE FOR MOBILE MESSAGING

(75) Inventors: Irvin Henderson, Palo Alto, CA (US); Naveen Dasa Sanjeeva, Milpitas, CA (US); Thyagarajapuram S. Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 221 days.

(21) Appl. No.: 11/221,994

(22) Filed: Sep. 7, 2005

(65) Prior Publication Data

US 2006/0053379 A1 Mar. 9, 2006

Related U.S. Application Data

(60) Provisional application No. 60/607,899, filed on Sep. 8, 2004.

(51) Int. Cl.
*G06F 15/173* (2006.01)
(52) U.S. Cl. .................. 709/223; 709/226; 715/752; 715/842
(58) Field of Classification Search ................ 709/228, 709/223, 226; 715/842, 752
See application file for complete search history.

(56) References Cited

U.S. PATENT DOCUMENTS

| 5,493,692 | A | 2/1996 | Theimer et al. | |
|---|---|---|---|---|
| 6,714,793 | B1 * | 3/2004 | Carey et al. | 455/466 |
| 6,760,580 | B2 * | 7/2004 | Robinson et al. | 455/412.2 |
| 6,912,563 | B1 * | 6/2005 | Parker et al. | 709/204 |
| 6,981,223 | B2 * | 12/2005 | Becker et al. | 715/753 |
| 7,127,685 | B2 * | 10/2006 | Canfield et al. | 715/842 |
| 7,231,229 | B1 * | 6/2007 | Hawkins et al. | 455/564 |
| 2002/0130904 | A1 | 9/2002 | Becker et al. | |
| 2002/0165000 | A1 * | 11/2002 | Fok | 455/466 |
| 2004/0006538 | A1 * | 1/2004 | Steinberg et al. | 705/39 |
| 2004/0128389 | A1 * | 7/2004 | Kopchik | 709/228 |
| 2004/0141594 | A1 | 7/2004 | Brunson et al. | |
| 2005/0003854 | A1 | 1/2005 | Sharma et al. | |

FOREIGN PATENT DOCUMENTS

WO WO-0158119 8/2001

OTHER PUBLICATIONS

International Search Report and Written Opinion dated Jun. 4, 2007, from International Application No. PCT/US05/32181, 10 pgs.
Korean Office Action mailed Jan. 19, 2009 for corresponding Korean Application 10-2007-7007977 filed Sep. 8, 2005, 5 pgs.

* cited by examiner

*Primary Examiner*—Thanh Tammy Nguyen
(74) *Attorney, Agent, or Firm*—Darby & Darby P.C.; David W. Foster (57) ABSTRACT

A system and method are directed towards providing a user interface for controlling a communication mode of a client device. The interface enables a user to set a presence and/or a communications mode, which the client device communicates to other devices directly or via an intermediary server. The presence generally reflects the user's availability, communication capability, desire to communicate, and the like. The presence can be directly or indirectly associated with the communication mode, which can comprise SMS, IM, email voice, and the like. The interface includes a contact list an enables the user to select a mode to communicate with a contact. The communication modes associated with each contact can also be incorporated into and displayed in an email address book. The interface also indicates the communication mode of each incoming and outgoing message in conversations with one or more other client devices.

18 Claims, 6 Drawing Sheets

MULTIMODAL INTERFACE FOR MOBILE MESSAGING

CROSS-REFERENCE TO RELATED APPLICATIONS

This application claims the benefit of U.S. Provisional Application Ser. No. 60/607,899 filed on Sep. 8, 2004, the benefit of the earlier filing date of which is hereby claimed under 35 U.S.C. § 119 (e) and which is further hereby incorporated by reference.

FIELD OF THE INVENTION

The present invention relates generally to mobile messaging, and more particularly, but not exclusively, to a user interface for controlling presence and the communication mode of mobile messaging.

BACKGROUND OF THE INVENTION

Mobile and stationary client devices often include two or more messaging capabilities such as voice, email, short message service (SMS), multimedia message service (MMS), instant messaging (IM), and the like. Some messaging systems, such as email systems and voice mail, include an automatic reply that a user can set, such as an "out of office" reply. Analogously, some IM systems include an automatic reply, indicating whether another user is currently online or otherwise available to communicate. Typically, such automatic replies must be set separately for each messaging capability. Also, one messaging capability is usually used at a time, even if multiple conversations are capable through a single messaging capability. Accordingly, separate interfaces for accessing and using messaging capabilities are generally provided, rather than in an integrated interface. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein, rather, these embodiments are provided so that this disclosure will be thorough and complete, and will fully convey the scope of the invention to those skilled in the art. Among other things, the present invention may be embodied as methods or devices, Accordingly, the present invention may take form of an entirely software embodiment, an entirely hardware embodiment or an embodiment combining software and hardware aspects. The following detailed description is, therefore, not to be taken in a limiting sense. Briefly stated, the present invention is directed towards providing a method and system for controlling a mode of communication with another user based on a presence status.

Illustrative Operating Environment

Figure 1:
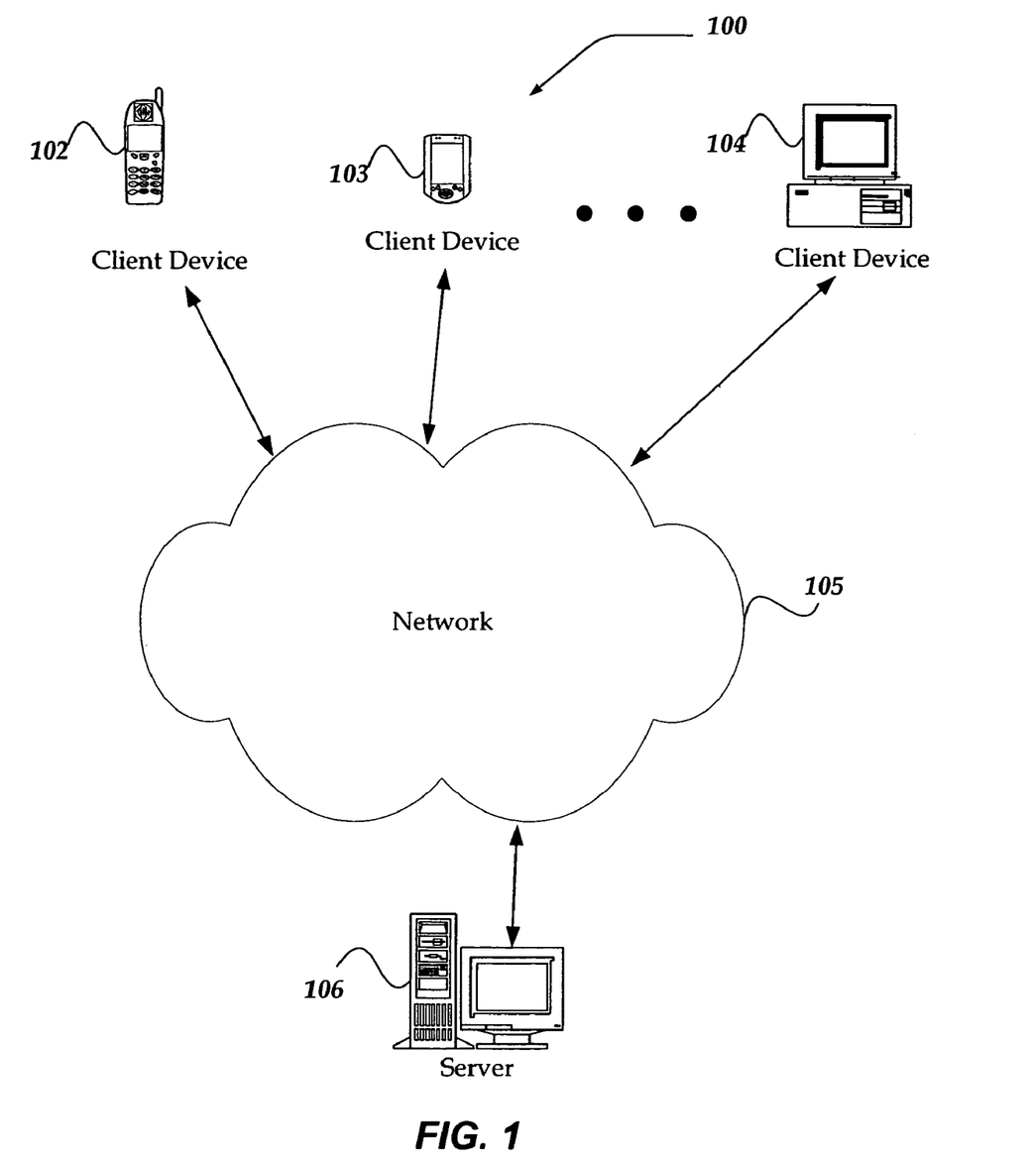
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, a network 105, and a server 106. Network 105 is in communication with and enables communication between each of client devices 102-104, and server 106.

Client devices 102-104 may include virtually any computing device capable of receiving and sending a message over a network, such as network 105, to and from another computing device, such as server 106, each other, and the like. The set of such devices may include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. The set of such devices may also include devices that typically connect using a wired communications medium such as personal computers, multiprocessor systems, microprocessor-based or programmable consumer electronics, network PCs, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 includes a user interface that enables a user to control settings, such as presence settings, and to instruct the client device to perform operations. Each client device also includes a communication interface that enables the client device to send and receive messages from another computing device employing the same or a different communication mode, including, but not limited to email, SMS, MMS, IM, internet relay chat (IRC), Mardam-Bey's internet relay chat (mIRC), Jabber, and the like. Client devices 102-104 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Network 105 is configured to couple one computing device to another computing device to enable them to communicate. Network 105 is enabled to employ any form of medium for communicating information from one electronic device to another. Also, network 105 may include a wireless interface, such as a cellular network interface, and/or a wired interface, such as the Internet, in addition to. local area networks (LANs), wide area networks (WANs), direct connections, such as through a universal serial bus (UJSB) port, other forms of computer-readable media, or any combination thereof. On an interconnected set of LANS, including those based on differing architectures and protocols, a router acts as a link between LANS, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, and server 106.

The media used to transmit information in communication links as described above illustrates generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal, " and "carrier-wave signal" includes a signal that has one or more of it characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Illustrative Client Environment

One embodiment of a client device, such as a client device 200 is described in more detail below in conjunction with a FIG. 2. Briefly, however, client device 200 may include any computing device capable of connecting to network 105 to enable a user to communicate with other client devices and/or server 106. Client device 200 may include many more components than those shown. The components shown, however, are sufficient to disclose an illustrative embodiment for practicing the invention.

The client device 200 includes a processing unit 212 and a mass memory in communication with each other via bus 222. The mass memory generally includes RAM 216, ROM 232, and one or more permanent storage devices 226, such as flash memory. For higher capability client devices such as a personal computer, permanent storage device 226 may include a hard disk drive, tape drive, optical drive, and/or floppy disk drive. Permanent storage device 226 can include computer-readable storage media. Storage media may include volatile, nonvolatile, removable, and non-removable media implemented in any method or technology for storage of information, such as computer readable instructions, data structure, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. Such code and data includes an operating system 220 for controlling the operation of client device 200. Any general-purpose operating system may be employed that is suited for the particular client device. A basic input/output system ("BIOS") 218 is also provided for controlling the low-level operation of client device 200.

One or more applications 250 are also loaded into mass memory and run on operating system 220. For instance, client device 200 may include a wireless instant message (IM) handler application for transmitting and receiving instant messages. Client device 200 may also include a simple mail transfer protocol (SMTP) handler application for transmitting and receiving email. Client device 200 may further include an HTTP handler application for receiving and handing HTTP requests, and an HTTPS handler application for handling secure connections. The HTTPS handle r application may initiate communication with an external application in a secure fashion. Other examples of application programs include schedulers, calendars, web services, transcoders, database programs, word processing programs, spreadsheet programs, and so forth.

Figure 2:
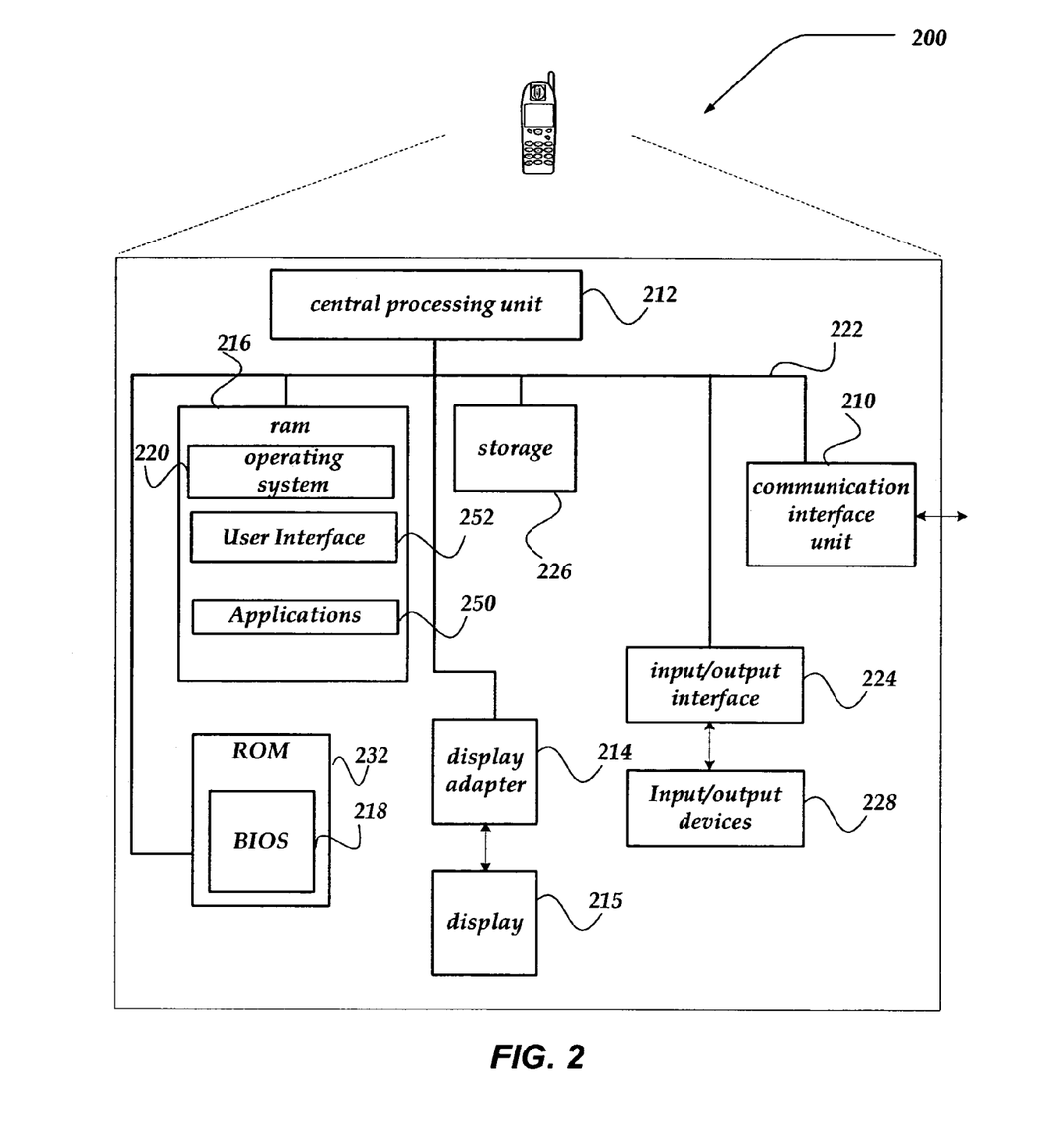
FIG. 2 shows one embodiment of a client device that may be included in a system implementing the invention.

As illustrated in FIG. 2, client device 200 also can communicate with a cellular telephone network, the Internet, or some other communications network, such as network 105 in FIG. 1, via communication interface unit 210, which is constructed for use with various communication protocols including code division multiple access (CDMA), global system for mobile communications (GSM), SMS, MMS, WAP, TCP/IP, and the like. Communication interface unit 210 is sometimes known as a transceiver, transceiving device, network interface card (NIC), and the like.

Client device 200 also includes input/output interface 224 for communicating with input/output devices 228, such as a keypad, thumb stick, rocker switches, mouse, keyboard, scanner, or other input devices not specifically shown in FIG. 2. A user of client device 200 can use input/output devices 228 to interact with a user interface 252 that may be separate or integrated with operating system 220 and/or applications 250. Interaction with user interface 252 includes visual interaction via a display 215, and a display adapter 214. Interaction with user interface 252 is discussed in further detail below.

User Interface Displays

Figure 3:
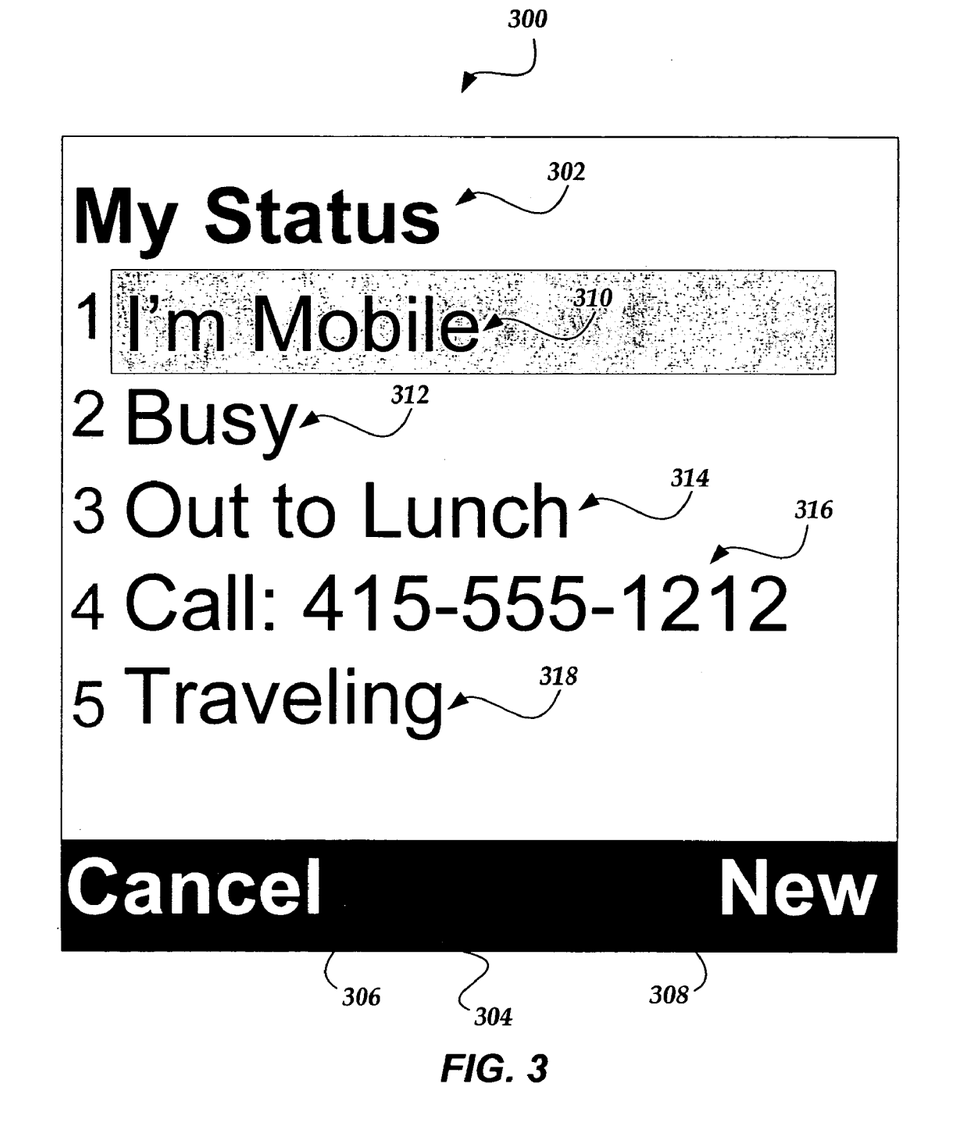
FIG. 3 is an image of a mobile device display illustrating a status menu according to one embodiment of the invention from which a user can select a presence status that will be indicated to others.

FIG. 3 is an image of a mobile client device display 300 illustrating a client status menu according to one embodiment of the invention from which a user can select a presence status. The presence status will be conveyed to other client devices that attempt to communicate with the mobile client device that has a presence status selected. The presence status may be conveyed directed from the client device or from an intermediary server that stores a current presence status of client devices. Display 300 includes a display heading 302 that indicates the display content. In this case, the display heading identifies a user's selected presence status from a list of predefined and/or user-defined presence status possibilities. Display 300 also includes a menu area 304 in which control options are displayed, such as a Cancel option 306 to exit the current display and a New option 308 to enable the user to enter a new presence status. The user can select the control options in one or more ways, depending on the capabilities of the client device. For example, the user can select a control option with one or more keys on a keypad of the client device and/or by touching the control options via the display.

Display 300 provides a number of exemplary presence statuses 310-318. The user can select a presence status with a highlight 311 and/or other indication. The selected presence status can indicate the user's availability, preferred mode of communication, and/or other characteristics. A particular mode of communication can be permanently or selectively associated with each presence status. The text associated with a presence status need not explicitly specify a mode of communication, nor even imply a mode of communication. In this case, the client device, or intermediary server, would convey the communication mode and associated text to any other client devices.

However, the text of the presence status also need not be directly associated with a communication mode. Instead, other client devices, and/or an intermediary server, can determine the communication mode from the text of the presence status. For example, presence status 310 indicates that the user is moving. Another user, another client device, or an intermediary server can reasonably deduce that the user would not likely want to communicate with conventional store-and-forward email. An SMS message might be a better choice, but that would require the user to enter a response with a keypad. If a user is truly mobile, such as driving a car or walking, it would be difficult to use the keypad. Thus, another human user, another client device, or an intermediary server, could deduce that the best communication mode may be cellular voice communication. Additional presence information could be obtained from the client device(s) or other sources to further refine the selection of the best communication mode. For instance, a transmitting client device could first attempt to place a cellular call or otherwise inquire as to whether a target client device was currently using cellular service. If not, the transmitting client device could try sending a voice instant message or other type of message. The transmitting client device can attempt a hierarchically set of communication modes until communication was successful.

Figure 4:
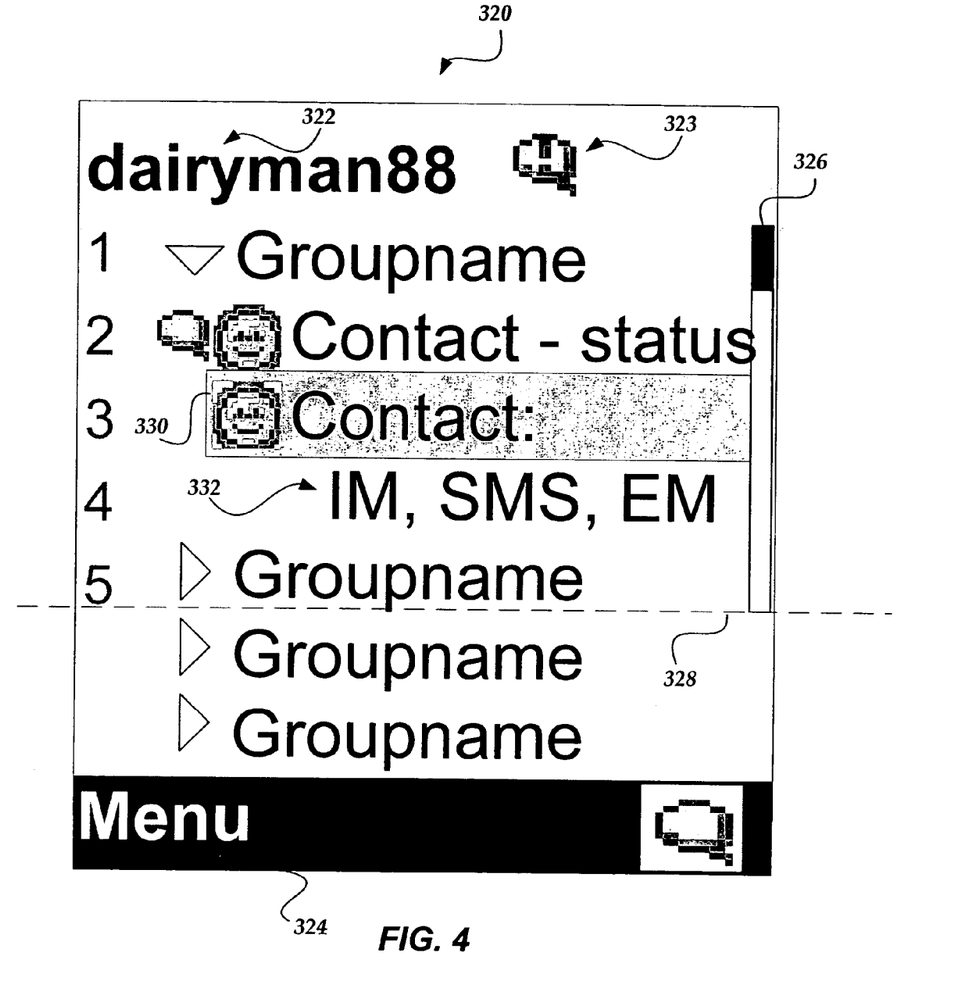
FIG. 4 is an image of a mobile device display illustrating a contact list according to one embodiment of the invention with which a user can interface to select a desired mode of communication with a contact.

FIG. 4 is an image of a mobile device display 320 illustrating a contact list according to one embodiment of the invention with which a user can interface to select a desired mode of communication with a contact. To accommodate multiple users of a single client device, display 320 can include a user ID 322 that indicates the owner of the contact list. An activity indicator 323 can also display whether a message is waiting for user ID 322 and/or whether user ID 322 is currently online and/or communicating with one or more contacts. Display 320 also includes a menu area 324 in which control options and other status information are displayed. If the display area is insufficient to display all content, a scroll bar 326 is displayed. For clarity, a content display limit line 328 indicates that content above limit line 328 can be view without scrolling, but content below limit line 328 must be scrolled into view with scroll bar 326.

The list of contacts can be organized into groups, which can be expanded to show a selected group of contacts. An icon or other indication can be displayed with each contact to indicate each contact's availability, involvement in a current conversation, and/or other status. A selected contact 330 is displayed with a list 332 of modes by which selected contact 330 can communicate. For example, selected contact 330 may be capable of communicating via IM, SMS, and email. These communication modes can be entered by the user when storing the contact in the client device. Alternatively, the client device can detect and store each mode of communication used by the contact to communicate with the client device. In addition, or alternatively, an intermediary server can detect, or otherwise store each mode of communication used by the contact and relay the modes to other client devices. The user of each client device can use a menu option to manually request an update of each or all contacts' communication modes. Alternatively, the client device can receive an automatic update from other client devices and/or a server. Similarly, the client device can receive an automatic update of presence information from other client devices and/or a server.

Selecting a communication mode in the contact list will generally depend on the capabilities of the client device. For example, the client device may enable the user to directly select a communication mode with a dynamically assigned key or may require the user to cycle through the communication modes and press an enter key. Other techniques include touch screen selection, voice command, multiple clicks within a time period, and the like.

A similar set of options for displaying contact communication modes can be incorporated into an email system run by PCs, web servers, and the like. For example, the contact list from the client device can be synchronized with an online email address list, and the email address list can display communication modes associated with each contact. This enables a user to select a communication mode via a PC client device and/or a mobile client device, and send a message according to the user's desired communication mode, regardless of the client device being used.

Figure 5:
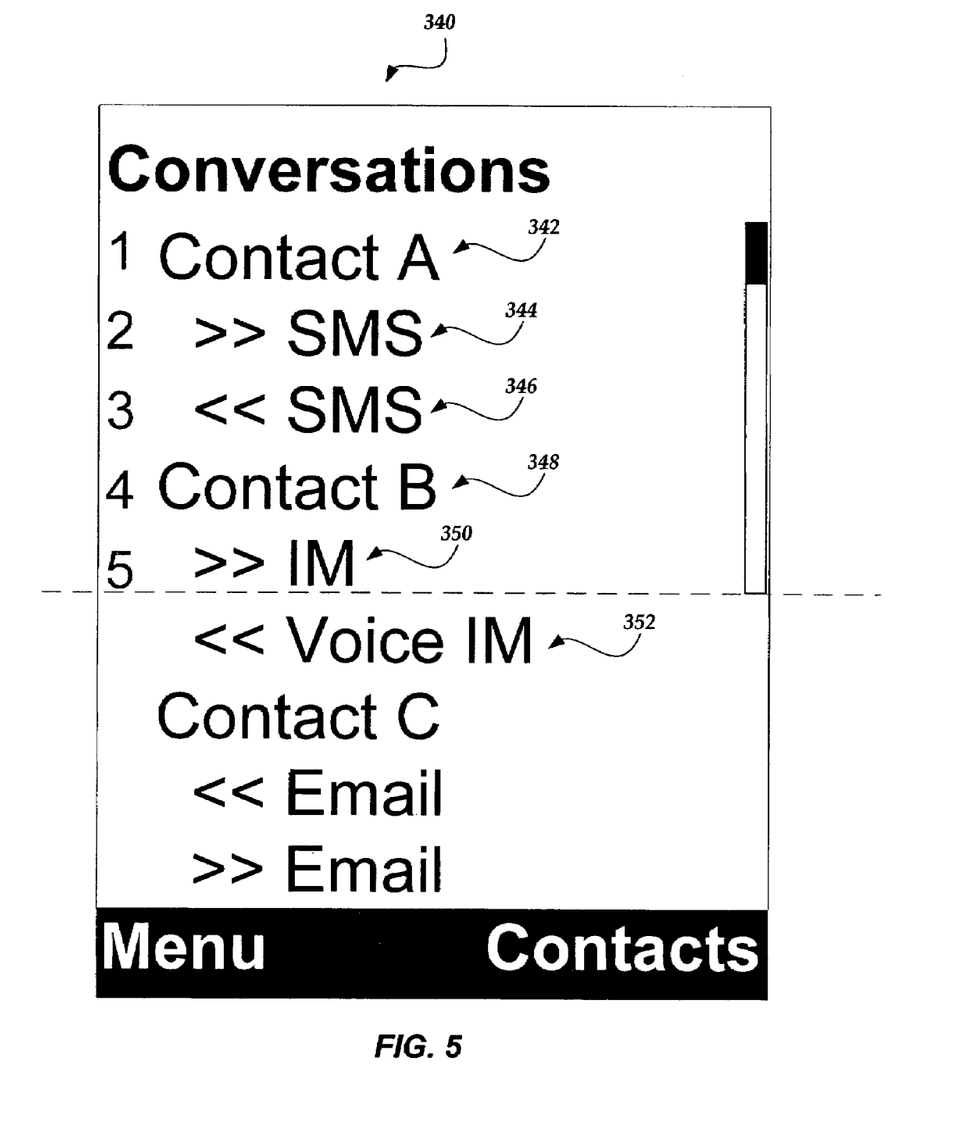
FIG. 5 is an image of a mobile device display illustrating a conversation list according to one embodiment of the invention, which shows one or more communication sessions in which the user involved.

FIG. 5 is an image of a mobile device display 340 illustrating a conversation list according to one embodiment of the invention, which shows one or more communication sessions in which the user is involved. For example, display 340 shows that the user is exchanging messages with contact A 342. Specifically, the display shows that the most recent outgoing message to contact A 342 was an SMS message 344. Similarly, the display shows that the most recent incoming message was from contact A 342 was an SMS message 346.

The communication modes need not to be the same. For instance, display 340 shows that the user chose to send an outgoing text IM 350 to contact B 348, while contact B 348 returned a voice IM 352. All, or a portion of each message text can be selectively displayed or hidden. The user can also select one of the contacts to hide or expand the view of messages exchanged with the selected contact. A similar set of options for displaying conversations can be incorporated into a communication system run by PCs, web servers, and the like.

Process Flow

Figure 6:
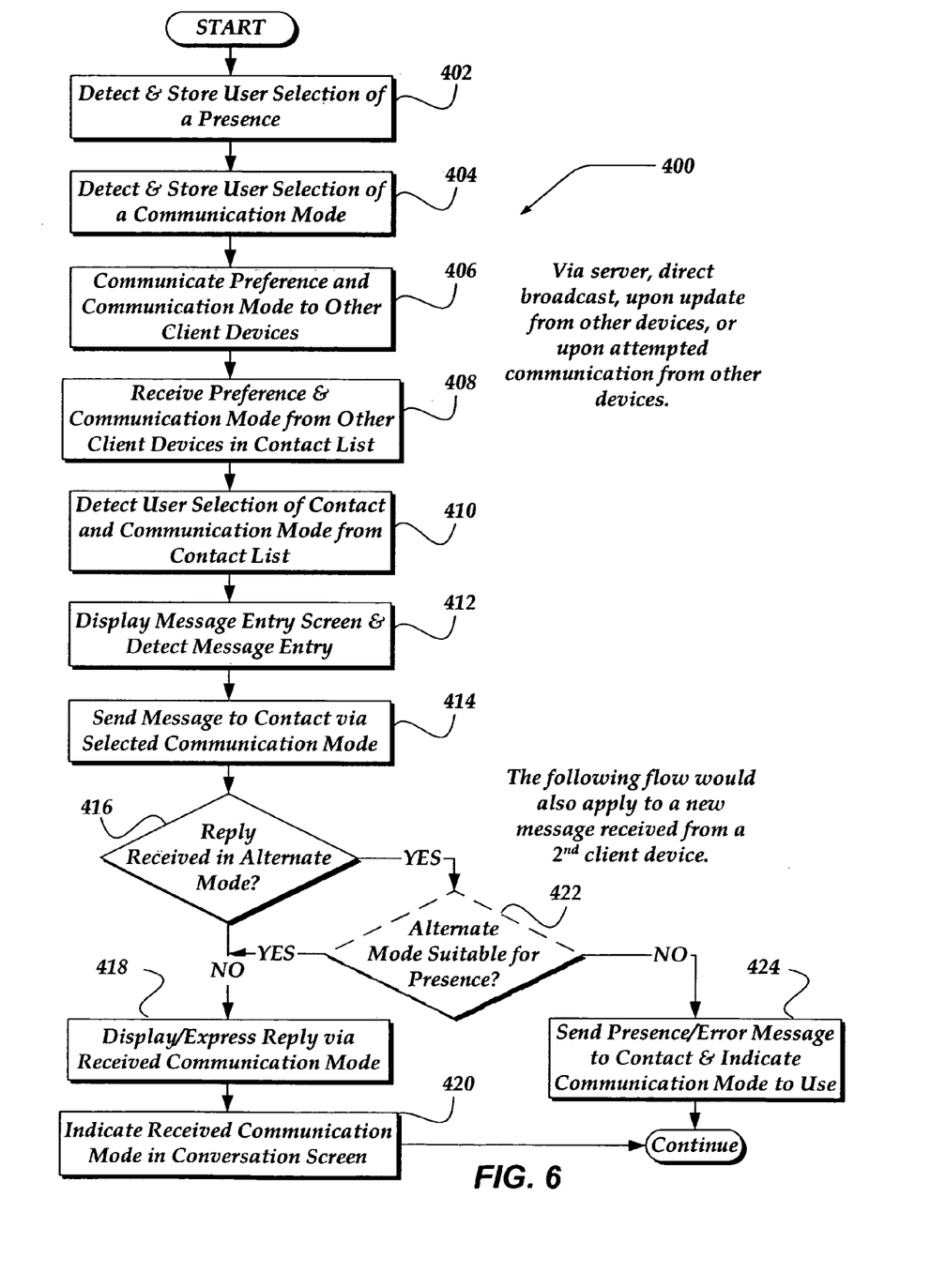
FIG. 6 illustrates a logical flow diagram generally showing one embodiment of a process for controlling multimodal communication.

The operation of certain aspects of the invention will now be described with respect to FIG. 6. FIG. 6 illustrates a logical flow diagram generally showing one embodiment of a process 400 for controlling multimodal communication, in accordance with the present invention.

As shown in the figure, process 400 begins, after a start block, at block 402, when a client device detects and stores a user selection of a presence. At a block 404, the client device detects and stores a user selection of a communication mode. Operations 402 and 404 can be performed in opposite order or one operation can be optional.

Processing next flows to block 406, where the client device communicates the selected presence and selected communication mode to other client devices. In one embodiment, this communication can be done directly by a broadcast to other client devices. However, the invention is not so constrained, and virtually any method of communicating the presence and mode can be used, including responding to an inquiry from other client devices, providing the presence and mode to an intermediary server for distribution, and the like. Similarly, the client device receives presence and mode data from other client devices, at a block 408. The client device updates the presence and mode data for those contact stored in the contact list of the client device.

When desired, a user selects a contact from the contact list to initiate communication at a block 410. The user's selection of a contact and the desired communication mode is detected, and a message entry dialog box or other interface is displayed at a block 412. When the user completes entry of a desired text, voice, video, emoticon, and/or other form of message, the client device sends the message to the selected contact via the selected communication mode, at a block 414.

Processing proceeds next to decision block 416, where a determination is made whether a reply, is received via the same, or an alternate communication mode. This determination, and the following operations, also apply to unsolicited incoming messages. If the incoming message is received via the same communication mode, the client device displays, or otherwise expresses the message at a block 418. The client device also indicates the communication mode in the conversation screen at a block 420. If the incoming message is received via an alternate communication mode, processing optionally proceeds to a decision block 422, where the client device determines whether the alternate communication mode is compatible with the current presence. Rules or other information can be associated with each presence status to determine which communication mode(s) can be used when a particular presence is currently set. Capabilities and/or limitations of the client device can also dictate which communication modes can be used to receive messages. If the alternate communication mode is compatible with the presence setting and/or the capabilities of the client device, the client device displays, or otherwise expresses the message at block 418. Conversely, if the alternate communication mode is not compatible, the client device can send the current presence status and/or an error message to the message sender at a block 424. The client device may also indicate the current communication mode setting of the client device and/or a compatible communication mode to the message sender. Processing then returns to a control module or otherwise continues.

The above specification, examples, and data provide a complete description of the manufacture and use of the composition of the invention. For example, an intermediary server can be used to store, compared, filter, and otherwise preprocess information, communication modes, and messages. Since many embodiments of the invention can be made without departing from the spirit and scope of the invention, the invention resides in the claims hereinafter appended.

What is claimed as new and desired to be protected by Letters Patent is:

1. A method for providing a user interface for controlling a communication mode, comprising:
    displaying on a first client device a plurality of presences, each of which at least partially indicates a user's availability to communicate through the first client device with another user of a second client device, wherein each of the plurality presences is associated with at least one type of communication mode;
    enabling the user of the first client device to select a presence from the plurality of presences;
    enabling the user of the first client device to select a preferred type of communication mode from a plurality of types of communication modes available for communication through the first client device with the second client device;
    if the second client device initiates communication over an incompatible type of communication mode with the first client device, providing at least the selected presence and the selected preferred type of communication mode to the second client device with which the first client device initially communicates;
    if the selected preferred type of communication mode is available, employing that communication mode for communication between the second client device and the selected presence of the user of the first client device;
    if the selected preferred type of communication mode is unavailable, determining another type of communication mode for optimized communication between the second client device and the selected presence of the user of the first client device;
    displaying a plurality of contacts with which the first client device can communicate using at least one of the types of communication modes; and
    displaying at least one type of communication mode in association with each of the plurality of contacts indicating the at least one type of communication mode with which each of the plurality of contacts can communicate with the first client device.

2. The method of claim 1, wherein each of the plurality of presences further indicates at least one of a communication capability of the first client device and a user's desire to communicate.

3. The method of claim 1, wherein the plurality of types of communication modes comprises at least one of a short message service mode, a multimedia message service mode, an instant message mode, a voice instant message mode, an email mode, and a voice communications mode.

4. The method of claim 1, wherein enabling the user to select the preferred type of communication mode comprises at least one of: enabling the user to select the type of communication mode as a preference in the first client device; and enabling the user to select the preferred type of communication mode to initiate communication with a contact associated with the second client device.

5. The method of claim 1, wherein providing the at least one of the selected presence and the selected communication mode to a second client device comprises at least one of: communicating the selected presence and the preferred type of communication mode directly to the second client device; and communicating the selected presence to an intermediary device that communicates the selected presence to the second client device.

6. The method of claim 1, further comprising displaying, on the first client device, at least one available type of communication mode with which the second client device can communicate with the first client device.

7. The method of claim 1, further comprising displaying at least one type of communication mode in association with each of a plurality of contacts in an email address book of the first client device that includes a contact for the user of the second client device.

8. The method of claim 1, further comprising displaying an indication of the selected preferred type of communication mode in association with at least one of an incoming message and an outgoing message in a conversation session with the second client device.

9. The method of claim 8, further comprising displaying a plurality of conversation sessions on the first client device.

10. A computer readable storage medium storing electronic device instructions that cause an electronic device to perform the actions of claim 1.

11. A client device for providing a user interface for controlling a communication mode, comprising:
  a display;
  a transceiver for receiving and sending information to another computing device;
  a processor in communication with the display and the transceiver; and
  a memory in communication with the processor and storing data and machine instructions that cause the processor to perform a plurality of operations, including:
    displaying a plurality of presences, each of which at least partially indicates a user's availability to communicate through the client device with at least one type of communication mode;
    enabling the user of the client device to select a presence from the plurality of presences, to indicate an availability of the user to communicate through the client device;
  enabling the user of the client device to select a preferred type of communication mode from a plurality of types of communication modes available for communication through the client device to other devices, wherein at least one of the plurality of types of communication modes is dependent on the selected presence;
    if a second client device initiates communication over an incompatible type of communication mode with the first client device, providing the selected presence and the selected preferred type of communication mode to the second client device with which the client device initially communicates;
  if the selected preferred type of communication mode is available, employing that communication mode for communication between the second client device and the selected presence of the user of the first client device;
  if the selected preferred type of communication mode is unavailable, determining another type of communication mode for optimal communication between the second client device and the selected presence of the user of the first client device;
    displaying a plurality of contacts with which the client device can communicate using at least one of the plurality of types of communication modes; and
    displaying at least one communication mode in association with each of the plurality of contacts indicating the at least one type of communication mode with which each of the plurality of contacts can communicate with the client device.

12. The client device of claim 11, wherein each of the plurality of presences further indicates at least one of a communication capability of the first client device and a user's desire to communicate.

13. The client device of claim 11, wherein the communication mode comprises one of a short message service mode, a multimedia message service mode, an instant message mode, a voice instant message mode, an email mode, and a voice communications mode.

14. The client device of claim 11, wherein the machine instructions further cause the processor to perform the operations of: enabling the user to select the type of communication mode as a preference in the client device; and enabling the user to select the type of communication mode to initiate communication with a contact associated with the second client device.

15. The client device of claim 11, wherein the machine instructions further cause the processor to perform the operations of: communicating the selected presence and the selected preferred type of communication mode directly to the second client device; and
    communicating the selected presence to an intermediary device that communicates the selected presence to the second client device.

16. The client device of claim 11, wherein the machine instructions further cause the processor to perform the operation of displaying at least one type of communication mode in association with each of a plurality of contacts in an email address book of the first client device that includes a contact for the user of the second client device.

17. The client device of claim 11, wherein the machine instructions further cause the processor to perform the operation of displaying an indication of the selected preferred type of communication mode in association with at least one of an incoming message and an outgoing message in a conversation session with the second client device.

18. The client device of claim 16, wherein the machine instructions further cause the processor to perform the operation of displaying a plurality of conversation sessions on the first client device.

* * * * *

UNITED STATES PATENT AND TRADEMARK OFFICE
CERTIFICATE OF CORRECTION

PATENT NO. : 7,587,482 B2  Page 1 of 2
APPLICATION NO. : 11/221994
DATED : September 8, 2009
INVENTOR(S) : Irvin Henderson et al.

It is certified that error appears in the above-identified patent and that said Letters Patent is hereby corrected as shown below:

On the title page, in field (57), under "Abstract", in column 2, line 4, delete "communications mode," and insert -- communication mode, --, therefor.

On the title page, in field (57), under "Abstract", in column 2, line 9, after "email" insert -- , --.

On the title page, in field (57), under "Abstract", in column 2, line 10, delete "list an" and insert -- list and --, therefor.

In column 1, line 59, delete "others;" and insert -- other users; --, therefor.

In column 2, line 13, delete "herein," and insert -- herein; --, therefor.

In column 2, line 17, delete "devices," and insert -- devices. --, therefor.

In column 2, line 18, after "take" insert -- the --.

In column 3, line 5, delete "(SMGL)," and insert -- (SGML), --, therefor.

In column 3, line 16, delete "to." and insert -- to --, therefor.

In column 3, line 18, delete "(UJSB)" and insert -- (USB) --, therefor.

In column 3, line 20, delete "LANS," and insert -- LANs, --, therefor.

In column 3, line 22, delete "LANS," and insert -- LANs, --, therefor.

In column 3, line 47, delete "signal, """ and insert -- signal," --, therefor.

In column 3, line 48, delete "it" and insert -- its --, therefor.

In column 3, line 58, after "with" delete "a".

In column 4, line 10, delete "data structure," and insert -- data structures, --, therefor.

In column 4, line 35, delete "handle r" and insert -- handler --, therefor.

UNITED STATES PATENT AND TRADEMARK OFFICE
CERTIFICATE OF CORRECTION

PATENT NO. : 7,587,482 B2
APPLICATION NO. : 11/221994
DATED : September 8, 2009
INVENTOR(S) : Irvin Henderson et al.

It is certified that error appears in the above-identified patent and that said Letters Patent is hereby corrected as shown below:

In column 5, line 10, delete "New" and insert -- new --, therefor.

In column 6, line 36, after "display" insert -- the --.

In column 6, line 46, after "with" insert -- a --.

In column 6, line 50, before "from" delete "was".

In column 6, line 51, delete "not to be" and insert -- not be --, therefor.

In column 7, line 49, delete "the presence" and insert -- the current presence --, therefor.

In column 7, line 64, before "information," insert -- presence --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,587,482 B2 Page 1 of 1
APPLICATION NO. : 11/221994
DATED : September 8, 2009
INVENTOR(S) : Henderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this

Fourteenth Day of December, 2010

David J. Kappos
*Director of the United States Patent and Trademark Office*